Figure 3:
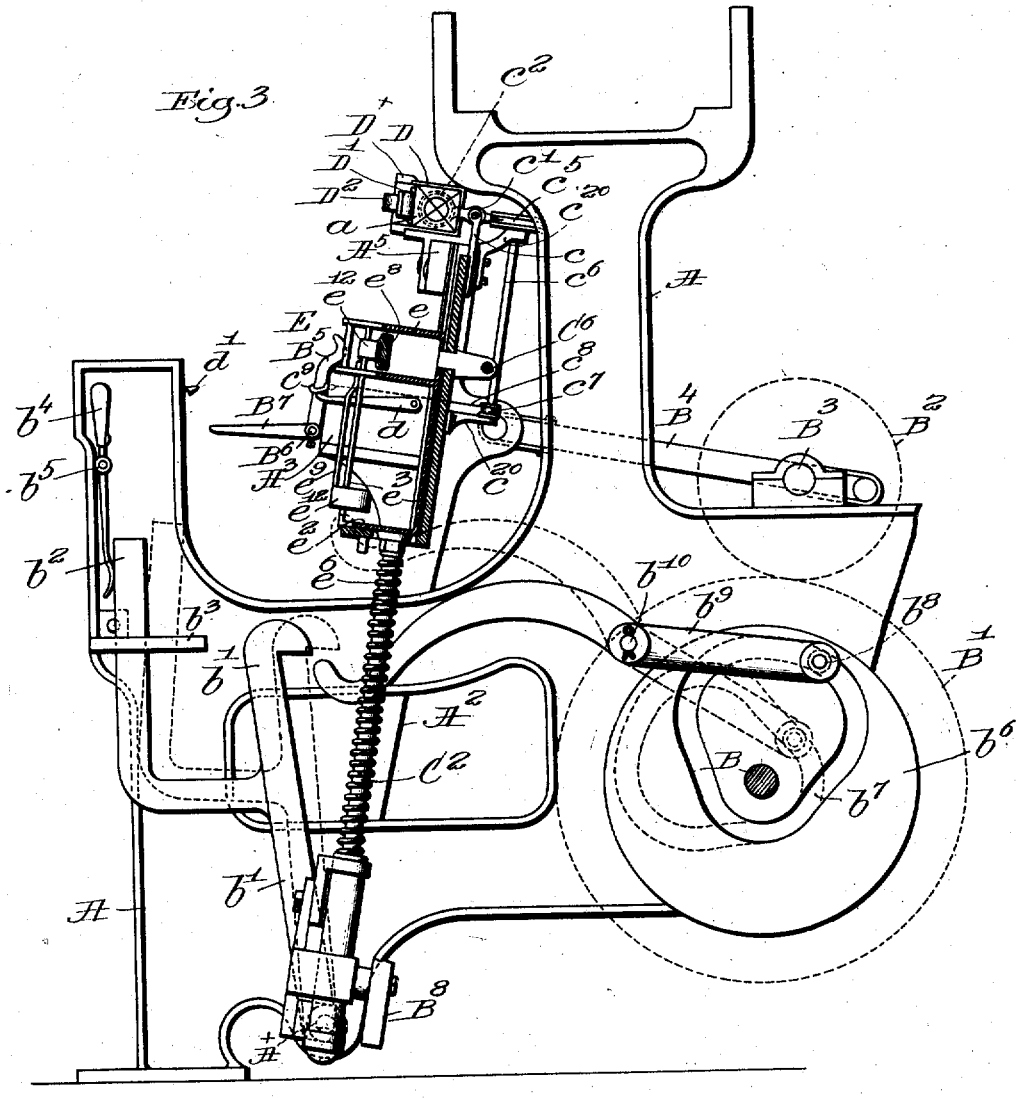

No. 12,370. REISSUED JULY 11, 1905.
E. D. THAYER.
WEFT REPLENISHING MECHANISM FOR LOOMS.
APPLICATION FILED APR. 12, 1905.
3 SHEETS—SHEET 1.
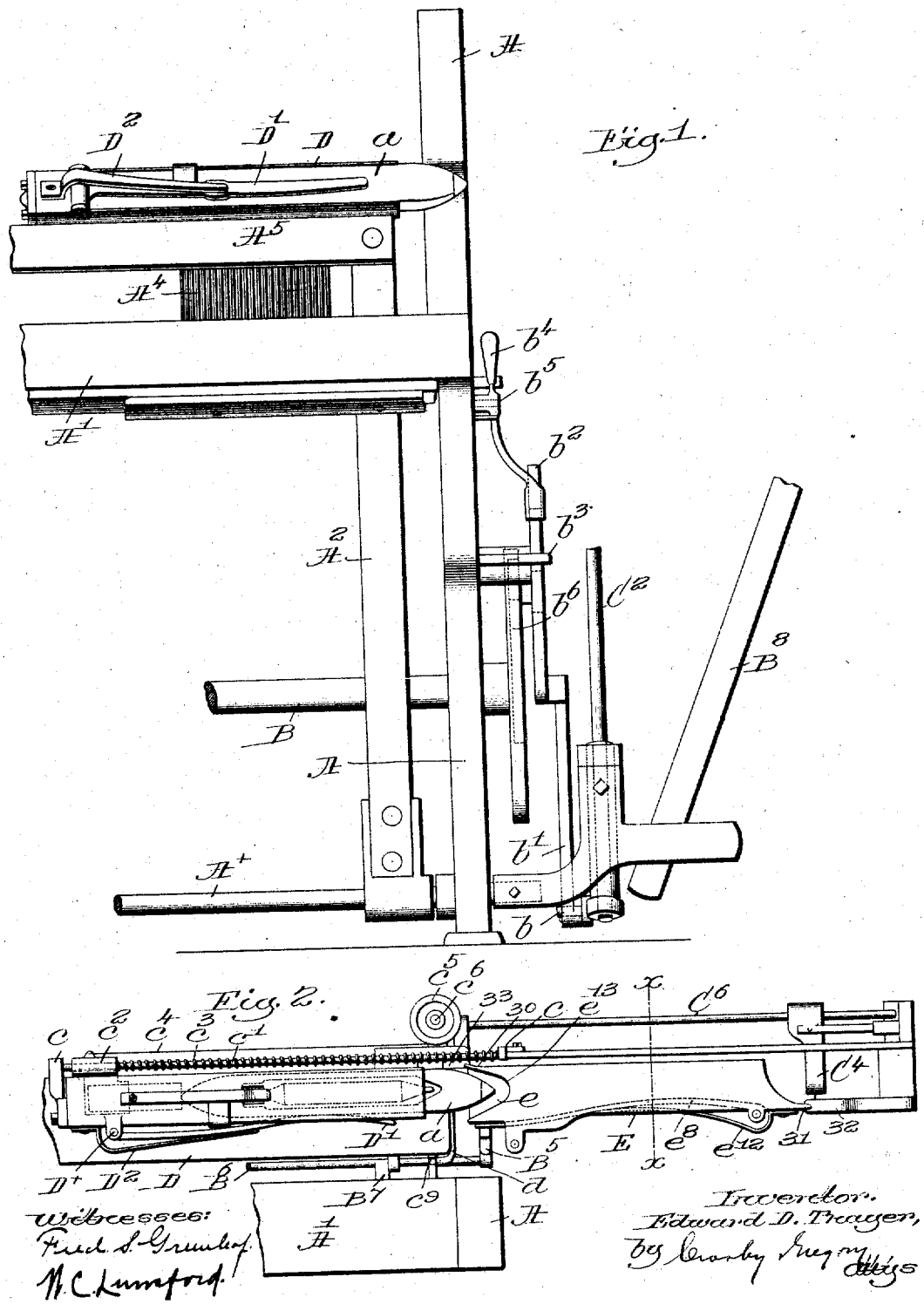

No. 12,370. REISSUED JULY 11, 1905.

E. D. THAYER.

WEFT REPLENISHING MECHANISM FOR LOOMS.

APPLICATION FILED APR. 12, 1905.

3 SHEETS—SHEET 2.

Witnesses:
H. C. Lunsford
Fred. S. Grumbof.

Inventor.
Edward D. Thayer,
by Crosby Gregory
Attys.

No. 12,370. REISSUED JULY 11, 1905.
E. D. THAYER.
WEFT REPLENISHING MECHANISM FOR LOOMS.
APPLICATION FILED APR. 12, 1905.
3 SHEETS—SHEET 3.
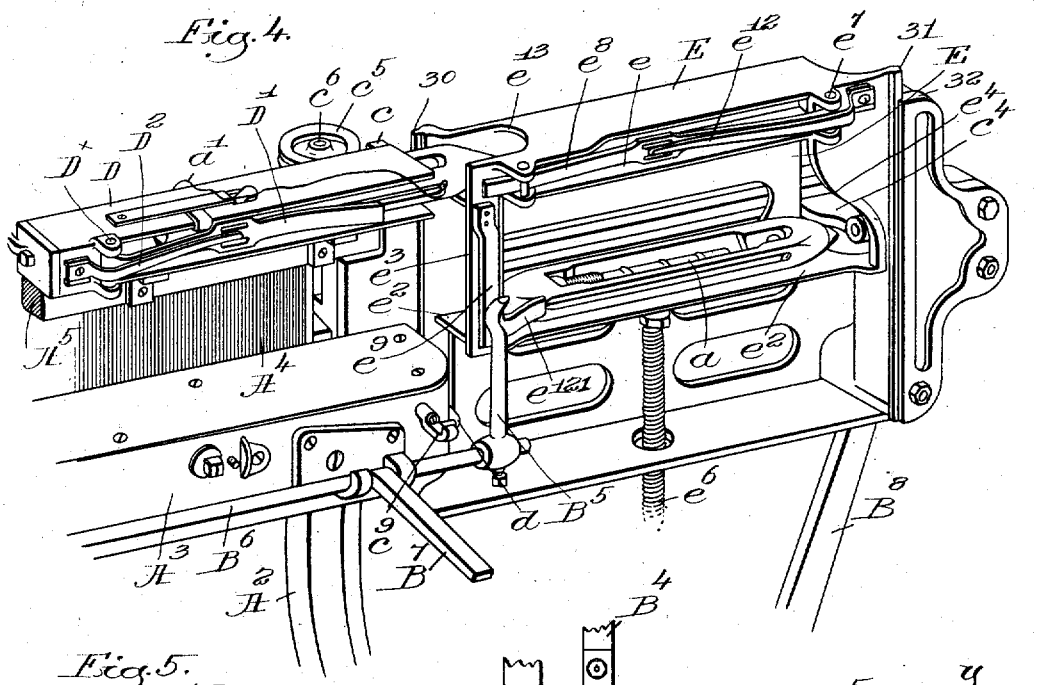
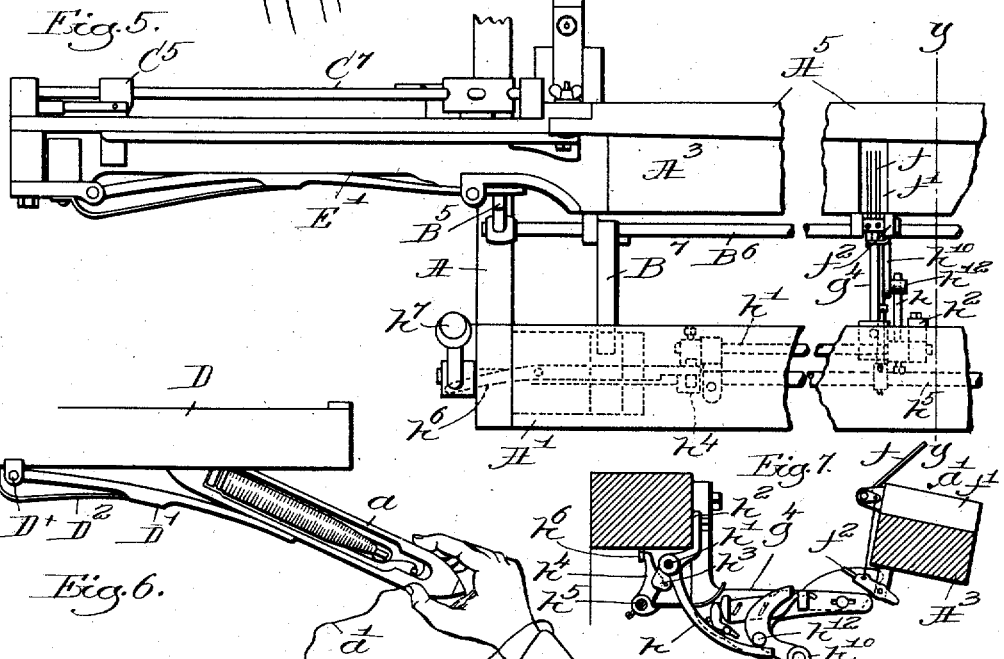
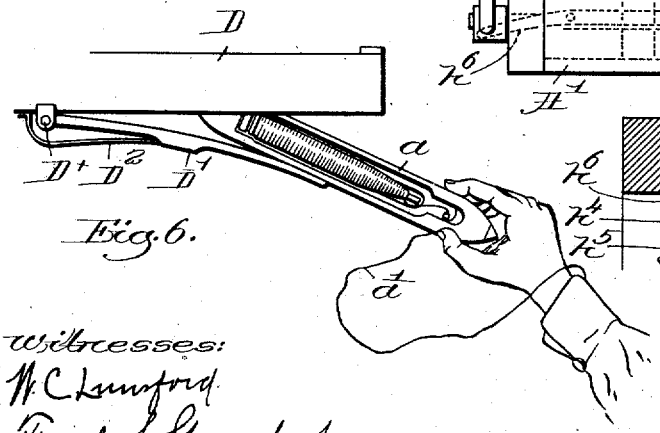
Witnesses:
H. C. Lunford
Fred. S. Grunhof.
Inventor,
Edward D. Thayer,
by Charles Rugg
Attys.
PHOTO LITHOGRAPHED BY SACHETT & WILHELMS LITHO. & PTG. CO. NEW YORK No. 12,370. Reissued July 11, 1905.

UNITED STATES PATENT OFFICE.

EDWARD D. THAYER, OF WORCESTER, MASSACHUSETTS, ASSIGNOR TO RANDOLPH CROMPTON, GEORGE CROMPTON, EDWARD D. THAYER, AND WILLIAM B. SCOFIELD, OF WORCESTER, MASSACHUSETTS, DOING BUSINESS UNDER THE FIRM-NAME OF CROMPTON-THAYER LOOM COMPANY, OF WORCESTER, MASSACHUSETTS.

WEFT-REPLENISHING MECHANISM FOR LOOMS.

SPECIFICATION forming part of Reissued Letters Patent No. 12,370, dated July 11, 1905.

Original No. 786,240, dated March 28, 1905. Application for reissue filed April 12, 1905. Serial No. 255,256.

*To all whom it may concern:*

Be it known that I, EDWARD D. THAYER, a citizen of the United States, residing at Worcester, in the county of Worcester and State of Massachusetts, have invented an Improvement in Weft-Replenishing Mechanism for Looms, of which the following description, in connection with the accompanying drawings, is a specification, like letters on the drawings representing like parts.

In looms having a filling-fork it is customary to supply filling to the raceway of the lay without stopping the loom. So, also, it is customary to employ a so-called "feeler" coacting with the filling in a running shuttle to cause the filling-supplying mechanism to act and supply fresh filling prior to total exhaustion of the filling from the running shuttle, and with looms of this class a weft-fork has been used solely for stopping the loom when the filling breaks. Provision for supplying filling prior to total exhaustion and for stopping the loom when the filling breaks is essential in a loom for weaving perfect cloth.

The incorporation in a loom of means for feeling through the shuttle onto the mass of filling therein to start into operation at the proper time the means to supply filling complicates the loom, as such mechanism is and must be very sensitive.

In broad looms, which should be run each by its own operator, I have found that the practical exhaustion of filling may be readily detected by the sight of the operator, and consequently I have devised a manually-controlled device that the operator just before complete exhaustion of the filling may move to start into operation means for resupplying a running-shuttle box with filling, thus obviating the stopping of the loom to supply filling after practical exhaustion of filling from the running shuttle, and to stop the loom in case the filling breaks, which cannot be detected in advance, I employ a filling-fork. The filling-supplying means made operative by the manually-controlled device contains but few parts and is novel and simple in construction.

In my novel loom the lay is provided with a cage for the reception of a spare shuttle containing filling, and for the running shuttle I employ a shuttle-box movable between the race of the lay and the cage, said shuttle-box, as shown, having a depending receptacle for the spent shuttle, the latter shuttle entering said receptacle while the movable shuttle-box occupies its elevated position for the reception of the spare shuttle from the cage.

Believing that I am the first to employ in an operative loom, with a weft-fork to stop the loom when the weft-breaks, filling-supplying means that may be operated at any desired time by a manually-controlled device, I do not intend to limit my invention to exactly the form of filling-supplying mechanism herein shown and intend to hold as within the scope of my invention any usual devices now commonly employed in looms for supplying filling to be carried through the shed.

It is not possible to use one and the same filling-fork for stopping the loom on the breakage of filling and for insuring a fresh supply of filling prior to substantial exhaustion.

Figure 1, in front elevation, shows part of the right-hand end of a loom with the shuttle-box E omitted. Fig. 2 is a plan view of Fig. 1, showing the shuttle-box. Fig. 3 is a right-hand end elevation of the loom, Fig. 1, the shuttle-box E being in section on the line $x$, Fig. 2, and the shuttle omitted. Fig. 4 is a perspective detail showing the movable shuttle-box in position to receive a spare shuttle, the spent shuttle being shown as having entered the spent-shuttle receptacle. Fig. 5 is a plan view of part of the left-hand end of the loom having the plain shuttle-box and showing a filling-fork to control the stopping of the loom when the filling breaks. Fig. 6 is a detail showing how a spare shuttle is supplied by hand to the spare-shuttle cage; and Fig. 7 is a section in the line $y\ y$, Fig. 5, looking to the right.

The loom-frame A, breast-beam A′, lay-swords $A^2$, pivoted on the rock-shaft $A^\times$ and carrying the lay-beam $A^3$, sustaining the reed $A^4$ and hand-rail $A^5$, the cam or lower shaft B, having a toothed wheel B′ meshing with the smaller toothed wheel $B^2$, fast on the crank-shaft $B^3$, the connecting-rods $B^4$, the binder-finger $B^5$, connected with the protector-rod $B^6$, having the dagger $B^7$, the picker-stick $B^8$, the stop-motion rock-shaft C, located under the breast-beam and having the usual shipper-handle C′ and the box-rod $C^2$, the pickers $C^4$ $C^5$, and picker guide-rods $C^6$ $C^7$ are and may be all as usual. In accordance with my invention the hand-rail of the lay is provided with a cage D for the reception of a spare shuttle $a$, the cage having a binder D′ pivoted thereon at $D^\times$ and acted upon by a spring $D^2$. The free end of the filling $a'$, led from the usual delivery-eye of the shuttle, is shown as carried over the cage and connected to some fixed stud or device of the lay.

The movable shuttle-box E, from which the running shuttle is thrown by the pickers across the race of the lay into the plain shuttle-box E′ at the opposite end of the lay (see Fig. 5) and back again pick after pick, is of peculiar construction—*i. e.*, it is composed of metal presenting ends 30 31, that are guided in usual ways 32 33, rigid with relation to the lay. The shuttle-box E has a top cell $e$, that when the loom is weaving and there is a sufficient supply of filling in the shuttle being thrown from said box occupies a position at the level of the race of the lay, as in Fig. 3. Under the cell $e$ the box presents a shelf $e^2$, (see Fig. 4,) sustained by depending arms $e^3$ $e^4$ of the box, the shelf and arms constituting the spent-shuttle receptacle. The shuttle-box rod $C^2$ is attached to the under side of the shelf $e^2$, and the rod in practice will be surrounded, as usual, with a spring $e^6$. The shuttle-box cell has an ear on which is pivoted at $e^7$ a binder $e^8$, the end of which coacts with the binder-finger $B^5$ to hold the dagger $B^7$ in such position when the shuttle is in the box as to insure the proper running of the loom. The binder $e^8$ is acted upon by a spring $e^{12}$, fixed at one end to the shuttle-box. The top of the cell of the shuttle-box at its inner end is cut out to form a space $e^{13}$, said space making it possible to use a shorter and lighter weight-cage D and permitting the end of the spare shuttle to project from the cage and occupy a position partly in the cage $e$ of the movable box E as the latter is lifted, as will be described and as shown in Figs. 3 and 4, to receive the spare shuttle. The lower end of the shuttle-box rod $C^2$ has a stud $b$, on which is pivoted a hook $b'$, shown as having an arm $b^2$, extended through a suitable guide $b^3$, the weight of the said arm in the present instance of this invention acting normally to keep said hook in its normal inoperative position, as shown by full lines, Fig. 3, with its upper end in contact with a hand-lever $b^4$, mounted on a stud $b^5$.

The shaft B has a disk $b^6$, provided with a groove $b^7$, that receives a roller or other stud $b^8$, carried by the short arm of a lever $b^9$, having its hub mounted on a stud $b^{10}$ at the loom end. As the shaft B is rotated the cam-groove $b^7$ moves the lever $b^9$ from one to its other extreme position, Fig. 3, said lever rising and falling once during each two strokes of the lay, it rising as the lay is moving forward and falling as the lay is moving backward. So long as the filling in the shuttle is not exhausted to the point where the missing of a pick would result in the production of imperfect cloth, which exhaustion may be determined by the eye of the operator looking at the running shuttle, the lever $b^9$ will be moved by cam $b^7$, but will do no work; but the operator as soon as he or she sees that the filling is nearly exhausted engages the hand-lever $b^4$, turns the same to move the hook $b'$ into its abnormal or operative position, (see dotted lines, Fig. 3,) so that as the lever $b^9$ is raised its end will engage said hook and lift the box-rod and move the box E from the position Fig. 3 into the position Fig. 4. The hook, lever, and its actuating means constitute one good simple and practical form of device for actuating the movable shuttle-box that it may receive a spare shuttle, and the hand-lever and hook constitute one good form of manually-controlled device for determining at will the exact time at which the running filling shall be discharged and new filling supplied; but, as before stated, this invention is not limited to the particular construction shown for said manually-controlled device or the particular construction of the means shown by which to raise and lower the movable shuttle-box. When the manually-controlled device is moved, the shuttle-box is started upwardly while the running shuttle is crossing from the movable shuttle-box end to the plain box end of the lay, and the then empty cell $e$ of said box is placed opposite the cage containing the spare shuttle, and the spent shuttle in its flight across the loom from the plain shuttle-box end of the lay enters the spent-shuttle receiver, as shown in Fig. 4, and while the movable box is opposite said cage the spare shuttle is moved from the cage into the cell $e$, as will now be described.

The lay $a$ is provided with ears $c$, that sustain a rod $c'$, on which is mounted a picker $c^2$, that is normally held in its position farthest from the movable shuttle-box E by a spring $c^3$. (Shown in Fig. 2.) The picker $c^2$ has joined to it one end of a cord $c^4$, that is connected at its other end with a drum $c^5$, carried by a shaft $c^6$, rotatable in suitable bearings $c^{20}$ (see Fig. 3) of the lay, said shaft at its lower end having a smaller drum $c^7$, with which is attached one end of a second cord $c^8$, led through a hole in the lay and provided, as shown, with a hook $c^9$. The action of the spring $c^3$ on the picker $c^2$ winds the cord $c^8$ on the pulley $c^7$. Now whenever the movable shuttle-box is raised to provide for supplying fresh filling thereto an arm $d$, (see Fig. 3,) carried by the shuttle-box E, meets the under side of the hook $c^9$ as the lay is moving forwardly and lifts said hook and causes it to be engaged by the catch $d'$, carried by the breast-beam, so that as the lay is moved on its back stroke the cord $c^8$ is held, and consequently the shaft $c^6$ is turned quickly and the cord $c^4$ is wound on the pulley $c^5$, and in so doing the picker $c^2$ is moved to the right, Fig. 2, pushing the spare shuttle from the cage into the empty cell. The free end of the binder D′ is shown as outturned, so that the end of a spare shuttle may be inserted easily into the cage while the lay is in motion.

The shuttle-box E has an attached auxiliary binder $e^9$, (see Fig. 4,) that is extended downwardly from its point of connection with the shuttle-box and is provided at its lower end with a toe $e^{121}$, that is acted upon by the spent shuttle as the latter comes back onto the shelf $e^2$ of the spent-shuttle receiver. The binder-finger $b^5$ rides on the upright part of the auxiliary binder as the shuttle-box is raised to receive the spare shuttle, thereby preventing the action of the dagger to stop the loom when a fresh shuttle is being supplied. The incoming spent shuttle acts through the finger to prevent the dagger $B^7$ from being raised to knock off and stop the loom. When the shuttle-box E in the position Fig. 3 has been supplied with a spare shuttle, said box drops and the finger passes from contact with the auxiliary binder and comes in operative relation on the usual binder $e^8$. Inasmuch as the short end of the auxiliary binder contacts only with the rear end of the spent shuttle, as shown in Fig. 4, when said shuttle fully enters the spent-shuttle receiver the spent shuttle may be easily discharged from the shelf $e^2$ and leave the loom in the movement of the lay. The shaft $B^6$ has usual binder-fingers, as $B^5$, and a dagger $B^7$, that acts in usual manner to stop the loom when the shuttle fails to be properly boxed.

The lay carries a filling-fork $f$, that feels during each movement of the lay for the filling $a$, (see Fig. 7,) which is supposed to be laid upon the race of the lay after each crossing of the shuttle from one to its opposite box, and when the filling is absent the fork enters the space $f'$ and lowers the dog $f^2$, so that as the lay completes its forward stroke in case the filling is absent said dog meets and turns an arm $h^{10}$, pivoted on a shield $g^4$, causing a pin $h^{12}$, carried by said arm, to meet and knock off the finger $h$ and turn the rock-shaft $h'$, sustained under the breast-beam in a suitable bracket $h^2$ connected therewith, causing an arm $h^3$, having a pin, (see Fig. 7,) to meet the arm $h^4$, fast on the rock-shaft $h^5$, and turn the same that the latter may meet the knock-off lever $h^6$ and turn the same to effect the release of the usual shipping mechanism, that when released coacts with the usual driving and brake mechanisms to stop the loom. The shipper rock-shaft has a handle $h^7$, by which the rock-shaft may be turned in the opposite direction when it is desired to start the loom.

The stop-motion mechanism (shown in Figs. 5 and 7) is of usual construction and being well known needs not to be herein more particularly described, and instead of the particular mechanism shown in detail Fig. 7 I may use any other suitable stop-motion mechanism whereby when the filling breaks or is absent from the lay when the feeler descends the loom will be stopped.

Having described my invention, what I claim as new, and desire to secure by Letters Patent, is—

1. In a loom, a lay, a shuttle-box, filling-changing mechanism, manually-controlled means for operating the same to change the filling in said shuttle-box, and independent means to stop the loom on the occurrence of a fault in the filling.

2. In a loom, a lay a spare-shuttle-carrying cage mounted thereon and movable with the lay, a movable shuttle-box to contain a running shuttle, and manually-controlled means for raising the movable shuttle-box in line with said cage to receive a spare shuttle to be delivered to the race of the lay at the descent of the shuttle-box.

3. In a loom, a lay, a spare-shuttle cage and a movable shuttle-box carried thereby, and manually-controlled means for causing the movable shuttle-box to be placed in position opposite said cage for the reception of a spare shuttle and to then place said shuttle at the level of the race of the lay, and independent means to stop the loom on the occurrence of fault in the filling.

4. In a loom, a lay, a spare-shuttle cage, a movable shuttle-box to contain a running shuttle, means to throw the running shuttle across the lay, manually-controlled means to move said shuttle-box when the running shuttle is in the opposite box into position opposite the spare-shuttle cage, and automatic means operating as the lay retires from the breast-beam to throw the spare shuttle into the cell of the moving shuttle-box.

5. In a loom, a lay, a spare-shuttle cage, a movable shuttle-box to contain a running shuttle, means to throw the running shuttle across the lay, manually-controlled means to move said shuttle-box when the running shuttle is in the opposite box into position opposite the spare-shuttle cage, and automatic means operating as the lay retires from the breast-beam to throw the spare shuttle into the cell of the moving shuttle-box, said movable shuttle-box having a chamber for the reception of the spent shuttle from the plain shuttle-box of the lay while the cell of the shuttle-box is opposite said cage.

6. In a loom, a lay, and a spare-shuttle cage sustained thereby combined with a movable shuttle-box having a cell at its upper end cut out at its top next the inner end of the spare-shuttle cage whereby the spare shuttle in said cage may be maintained therein with its outer end extended into the plane of the vertical movement of said shuttle-box, substantially as described.

7. In a loom, a lay having a spare-shuttle cage mounted on and movable therewith and provided with a binder, and a movable shuttle-box carried by the lay for sustaining a running shuttle, said box having under it a connected spent-shuttle receiver, means to move said shuttle box and receiver on the lay to place the empty cell of the shuttle-box which receives the running shuttle opposite said spare-shuttle cage and the spent-shuttle receiver opposite the raceway of the lay, the latter to receive the spent shuttle on its return flight, and means to move the spare shuttle from the spare-shuttle cage into the cell of the shuttle-box.

8. In a loom, a movable shuttle-box having at its upper end a cell for a running shuttle, and having below said cell a shelf to sustain a spent shuttle, and a binder-finger, a protector-shaft sustaining the same, combined with a binder having its inner end downturned that the binder-finger may continue to bear thereon when the shuttle-box is elevated to receive a shuttle.

9. In a loom, a lay, a running and a spare shuttle box both moving at all times with the lay, filling-changing means, and manually-controlled means for effecting the operation of the filling-changing means.

10. In a loom, a lay provided with a spare-shuttle cage, a shuttle-box mounted on said lay and having at its upper end a cell for controlling a running shuttle and below said box a spent-shuttle receiver, and a shaft having a protector and binder-finger, combined with a binder for the box containing the running shuttle, and an auxiliary binder connected with the shuttle-box and extended downwardly thereover and having at its lower end a toe to be acted upon by the spent shuttle, said binder-finger riding on said auxiliary binder when the box that controls the running shuttle is raised to receive a shuttle from the spare-shuttle cage, said auxiliary binder preventing the operation of the protector to stop the loom.

11. In a loom, a lay provided with a spare-shuttle cage, a shuttle-box carried by said lay and provided with a cell for a running shuttle and a spent shuttle receiver, a binder for the cell containing the running shuttle, and an auxiliary binder having a toe at its lower end to act on the spent shuttle, a protector-rod having a connected dagger, and a binder-finger to ride on said auxiliary binder and prevent the placing of the dagger in position to stop the loom when the shuttle-box is raised to receive a fresh shuttle in that cell thereof which is to contain the running shuttle, the spent-shuttle receiver being then without a shuttle.

In testimony whereof I have signed my name to this specification in the presence of two subscribing witnesses.

EDWARD D. THAYER.

Witnesses:

CHARLES F. ALDRICH,
SAML. H. CLARK.